United States Patent
Halmos et al.

(10) Patent No.: US 7,098,999 B1
(45) Date of Patent: Aug. 29, 2006

(54) HIGH-SPEED READOUT CIRCUIT AND SYSTEM INCORPORATING SAME

(75) Inventors: Maurice J. Halmos, Encino, CA (US); Louis F. Klaras, Rancho Palos Verdes, CA (US); Jean-Paul Bulot, Redondo Beach, CA (US)

(73) Assignee: Raytheon Company, Waltham, MA (US)

( * ) Notice: Subject to any disclaimer, the term of this patent is extended or adjusted under 35 U.S.C. 154(b) by 181 days.

(21) Appl. No.: 10/794,490

(22) Filed: Mar. 5, 2004

(51) Int. Cl.
*G01C 3/08* (2006.01)
(52) U.S. Cl. .................. 356/5.01; 356/4.01; 356/3.01; 356/3.1
(58) Field of Classification Search ............... 356/4.01
See application file for complete search history.

(56) References Cited

U.S. PATENT DOCUMENTS

| | | | | |
|---|---|---|---|---|
| 4,835,382 A | * | 5/1989 | Perrot et al. | ........... 250/231.13 |
| 5,056,914 A | * | 10/1991 | Kollodge | ................... 356/5.05 |
| 5,608,514 A | * | 3/1997 | Stann et al. | ............... 356/5.09 |
| 6,133,989 A | * | 10/2000 | Stettner et al. | ............ 356/4.01 |
| 6,429,941 B1 | * | 8/2002 | Kamon et al. | .............. 356/614 |

* cited by examiner

*Primary Examiner*—Thomas H. Tarcza
*Assistant Examiner*—Luke Ratcliffe
(74) *Attorney, Agent, or Firm*—John E. Gunther; Leonard A. Alkov; Karl A. Vick (57) ABSTRACT

A readout system for receiving return signals originating from one or more energy pulses fired toward a scene. The system includes a first mechanism for detecting energy received from the scene and providing a first signal in response thereto. A second mechanism times a rising edge and a falling edge of a pulse contained in the first signal and provides a second signal in response thereto. In a specific embodiment, a third mechanism determines characteristics of the pulse based on the second signal, which include characteristics, such as pulse width, pulse intensity, and/or pulse centroid, sufficient to generate an image of the scene.

14 Claims, 3 Drawing Sheets

HIGH-SPEED READOUT CIRCUIT AND SYSTEM INCORPORATING SAME

FIELD OF INVENTION

This invention relates to signal processing. Specifically, the present invention relates to readout circuits and accompanying systems for reading data from detectors or arrays of detectors.

DESCRIPTION OF THE RELATED ART

Readout circuits are employed in various demanding applications. Manned and unmanned aerial vehicles and missiles require high-accuracy and high-resolution laser radar for advanced target recognition (ATR), target under trees (TUT), obstacle avoidance, and vehicle guidance. Such systems require compact, cost-effective, high-bandwidth, and efficient readout circuits for handling data output from arrays of energy detectors.

Efficient high-bandwidth readout circuits are particularly important in three-dimensional (3-D) flash ladar applications; where low bandwidth severely compromises ladar system imaging capabilities both in accuracy and range resolution. Conventionally, 3-D flash ladar systems often employ a pulsed laser system to fire illuminating laser pulses at a scene, thereby flashing the scene. An accompanying array of photodetectors in a Focal Plane Array (FPA) receives laser energy reflected from the scene. Each photodetector provides a pixel in an image generated from reflected laser energy.

The FPA converts received optical energy into an array of corresponding electrical signals, which are input to a Readout Integrated Circuit (ROIC). The time between laser pulse transmission and reception of the first return (reflected) pulse by each individual photodetector is measured by the accompanying ROIC circuit. The ROIC circuit may also measure or approximate return pulse-intensity information contained in the electrical signals output from each detector. The intensity information output from each photodetector enables accompanying imaging systems to generate two-dimensional images of the scene. Three-dimensional images are obtained by incorporating timing information, pertaining to the delay between pulse transmission and reception, which provides range or distance information associated with each return.

An Imaging System may employ one of several methods to measure Time of Arrival (TOA) and compute a range instrument. One method employs a leading edge threshold comparator to register the receipt of the leading edge of a return pulse. The range accuracy of this method depends on received pulse width and amplitude. Narrower pulses yield higher accuracy. Another method involves digitizing the received signal over a short interval and often requires that the signal peak not be compressed, skewed, or clipped. This approach is often impractical for wide-bandwidth circuits, which often have limited dynamic range due to raised noise floor and low power-supply voltage. Another method employs a constant fraction discriminator circuit. Unfortunately, this method also provides limited dynamic range.

In an Imaging System, the ROIC compares electrical signals output from each photodetector pixel to a predetermined threshold. If the threshold is exceeded, then the received signal is considered a laser return signal. Otherwise, received signals are disregarded as noise.

Conventional ROIC's often employ sample-and-hold techniques to readout data from a FPA. Such ROIC's employ sample-and-hold circuits to sample return pulses and then often store resulting samples via analog capacitors. These sample-and-hold circuits are typically undesirably large and have low bandwidth, which limits sampling rate. Image range depth is compromised accordingly. Analog sample-and-hold readout circuit components often limit data transfer frame rates to between 30–60 Hz, which is undesirably slow.

Demand for improved sensor technology, particularly improved high-accuracy and high-resolution 3-D flash ladar technology, is increasing with the proliferation of miniature unmanned vehicles. These vehicles require precise, lightweight, miniature sensors to effectively takeoff, land, and avoid obstacles, and navigate.

Such applications typically demand ladar systems to have high range depth accuracy (z accuracy less than 4 inches) and high resolution (separation of two objects in z less than 4 inches apart). Requirements for these numbers leads to a greater than 2 GHz receiver bandwidth with a greater than 4 GHz sampling clock rate in accordance with the Nyquist theorem. Such high sampling rates require ROIC's to accommodate many samples per pixel. However, current ROIC's employing sample-and-hold methods cannot accommodate sufficient storage capacitors to effectively accommodate such high sampling rates.

Traditionally, 3-D flash ladar systems employ the first return detected by each photodetector to construct a three-dimensional image of the scene. To enhance scene quality, engineers experimented with changing pulse widths and increasing system bandwidth. However, such systems often ignore valuable information contained in subsequent returns. Existing ROIC's have difficulty achieving high bandwidth, high sampling rate, and detecting multiple returns per pixel. To receive and analyze multiple returns using conventional sample-and-hold technology would require an impractical number of sample-and-hold circuits.

Conventional ladar systems employ pulse-centroid and pulse-intensity information to facilitate scene imaging. Pulse-intensity information is required for optimal image clarity. Pulse intensity and pulse centroid are often measured directly from the received analog electrical pulse output from the FPA in response to receipt of the laser return. However, analog circuitry for measuring pulse intensity and centroid is often bulky and consumes excess power.

To improve image resolution, some systems employ narrow pulses. However, use of intense narrow pulses requires a wider bandwidth, which increases the noise floor, resulting in reduced dynamic range and pulse clipping. Consequently, intensity information and pulse-centroid information contained in these returns is lost, since conventional ladar systems often require the full pulse to accurately determine pulse centroid and intensity. Clipping is particularly problematic in systems requiring pulse-intensity and centroid information for accurate target detection and tracking. Conventional ROIC's often lack sufficient bandwidth to accommodate very narrow and/or high frequency pulses, which are often required for optimal image resolution.

Conventional 3-D flash ladar sensors often employ ROIC's that cannot accommodate multiple returns and have limited frame rates between 30–60 Hz due to hardware and system design constraints. High frame rates are required for obstacle avoidance, such as for avoiding wires. Narrow laser pulses, resulting in wide-bandwidth receivers, are required to resolve two targets close together and to achieve range resolutions of less than 4 inches.

Conventionally, a tradeoff exists between high accuracy, short-distance z-resolution (object separation), and intensity information. To increase z-resolution, bandwidth is increased. However, as system bandwidth increases, dynamic range often decreases, resulting in lost intensity information.

Hence, a need exists in the art for a compact, efficient, high-bandwidth readout circuit that can effectively accommodate multiple signal returns per pixel from a given pulse and that can effectively accommodate high frame rates and sampling rates while maintaining intensity information.

SUMMARY OF THE INVENTION

The need in the art is addressed by the readout system for receiving return signals originating from an energy pulse fired toward a scene of the present invention. In the illustrative embodiment, the inventive system is adapted for use in ladar applications. The system includes a first mechanism for detecting energy received from a scene and providing a first signal in response thereto. A second mechanism times a rising edge and a falling edge of a pulse contained in the first signal and provides a second signal in response thereto.

In a specific embodiment, a third mechanism determines characteristics of the pulse based on the second signal, and the second mechanism accommodates plural pulses. The second mechanism includes a mechanism for timing rising edges and falling edges of plural pulses contained in the first signal and providing the second signal in response thereto. The third mechanism includes a mechanism for determining characteristics of the pulses based on the second signal. The characteristics include characteristics sufficient to generate an image of the scene, including pulse width, pulse intensity, and/or pulse centroid.

In a more specific embodiment, the system further includes a fourth mechanism for generating an image based on the characteristics. A fifth mechanism stores the characteristics for multiple return signals caused by a single pulse. The third mechanism includes a module containing information pertaining to a shape of the fired energy pulse and an expected shape of corresponding return pulses. The expected shapes of the return pulses are employed by the third mechanism to determine pulse intensity and pulse centroid as needed. The single pulse is a laser pulse, and the energy received from the scene is laser energy. The second signal is a digital signal, and the second mechanism includes a circuit for timing receipt of the rising edges and the falling edges by determining when the first signal passes one or more thresholds.

In the specific embodiment, the first mechanism includes an array of photodetectors for receiving the laser energy and providing the first signal in response thereto, which is an electrical signal. The second mechanism further includes a mechanism for selectively adjusting the one or more thresholds for each photodetector in the array of photodetectors.

The novel design of the present invention is facilitated by the mechanism for timing rising and falling pulse edges, thereby obviating conventional problematic sampling-and-holding techniques. Embodiments of the present invention cleverly employ rising and falling pulse edges to provide a digital signal from which pulse-intensity, pulse-width, and pulse-centroid information can be extracted. This enables use of broadband ladar readout circuits that can measure multiple returns from a single fired laser pulse while maintaining data integrity and minimizing digital noise interference with the analog signal output from the photodetector.

DESCRIPTION OF THE INVENTION

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Figure 1:
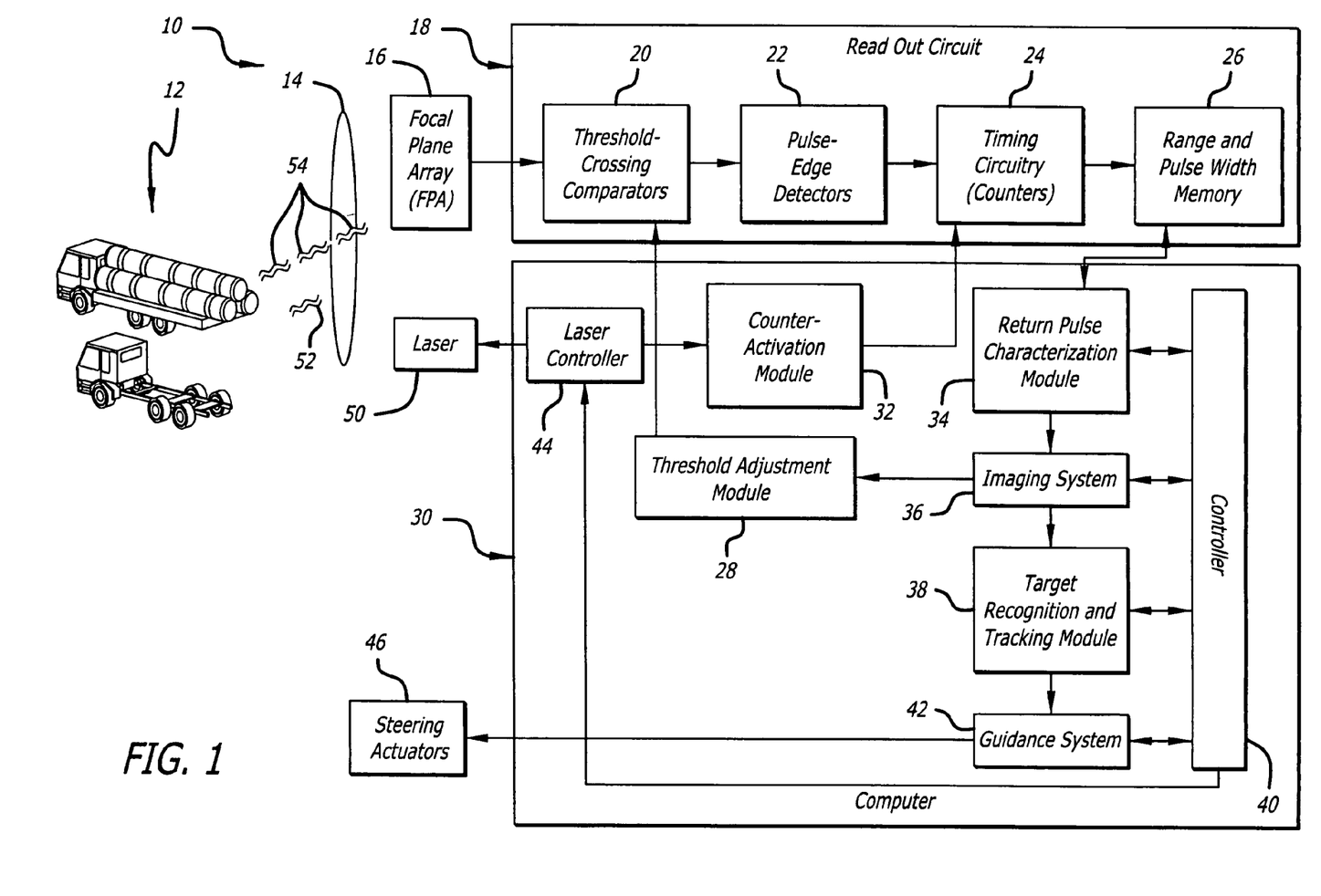
FIG. 1 is a diagram of a ladar system employing a unique readout circuit according to an illustrative embodiment of the present invention.

FIG. 1 is a diagram of a ladar system 10 employing a unique readout circuit 18 according to an embodiment of the present invention. For clarity, various components, such as power supplies, local oscillators, integrated circuit chips, and so on have been omitted from the figures. However, those skilled in the art with access to the present teachings will know which components to implement and how to implement them to meet the needs of a given application.

In the present embodiment, the system 10 is aimed at a scene 12 and includes a common aperture 14 through which the ladar system 10 views the scene 12. The ladar system 10 includes a Focal Plane Array (FPA) 16 that provides inputs to one or more transimpedance amplifiers (TIA's) 22. The inputs from the detectors of the FPA 16 to the transimpedance amplifiers 22 are biased via biasing currents or voltages provided via a detector biasing circuit 48. The biasing functionality provided by the biasing circuit 48 may be integrated with the transimpedance amplifiers 22 without departing from the scope of the invention.

The outputs of the TIA's provide inputs to threshold-crossing comparators 20 of the readout circuit 18. The readout circuit 18 may incorporate the one or more transimpedance amplifiers 22, as discussed more fully below, to convert current signals output from the FPA 16 into voltage signals.

The readout circuit 18 includes the threshold-crossing comparators 20, timing circuitry 24, and range and pulse width memory 26. The threshold-crossing comparators 20 provide input to the timing circuitry 24, outputs of which are selectively clocked into the range and pulse width memory 26.

The threshold-crossing comparators 20 receive threshold-adjustment signals from a threshold-adjustment module 28 running on a computer 30. The timing circuitry 24 receives control input (A-Trig or start) from a counter-activation module 32 running on the computer 30. The range and pulse width memory 26 of the readout circuit 18 communicates with a return pulse characterization module 34 running on the computer 30. The computer 30 also runs an imaging system 36, a target recognition and tracking module 38, a guidance system 42, a laser controller 44, and a system controller 40. The system controller 40 communicates directly with and controls the modules 34–44.

The return pulse characterization module 34 provides input to the imaging system 36, which provides input to the target recognition and tracking module 38 and the threshold-adjustment module 28. The target recognition and tracking module 38 provides input to the guidance system 42, which provides input to steering actuators 46. The laser controller 44 receives control input from the system controller 40 and provides input to a laser 50 and the counter-activation module 32. Those skilled in the art will appreciate that various modules, such as the steering actuators 46, the target recognition and tracking module 38, and the guidance system 42, may be omitted without departing from the scope of the present invention.

In operation, software running on the controller 40 selectively enables the laser controller 44, which activates the laser 50 in accordance with a predetermined algorithm. The laser controller 44 may adjust laser pulse width, frequency, intensity, and so on in response to feedback from the controller 40. Those skilled in the art will know how to adjust the firing of the laser 50 to meet the needs of a given application.

The laser 50 fires a pulse 52 toward the scene 12. The pulse 52 flashes, i.e., illuminates the scene 12 to facilitate obtaining a three-dimensional image of the scene 12. Hence, the system 10 is a 3-D flash ladar system.

As the pulse 52 impinges on the scene 12, various obstacles, such as trees or camouflage netting, may yield plural laser returns 54 per pixel. In a conventional ladar system, only the first of the returns 54 is registered. The first of the returns 54 may contain laser energy reflected from trees in the scene 12, while subsequent returns may contain laser energy reflected from objects behind the trees. The ability to handle multiple returns per pixel enables the ladar system 10 to see through trees, camouflage netting, and so on, by registering information contained in subsequent returns.

Conventional sample-and-hold systems lack requisite bandwidth to process multiple returns or to accommodate very narrow pulses. However, the system 10 obviates sampling and holding and provides sufficient bandwidth to handle both multiple returns 54 and very narrow pulses.

The FPA 16 is an array of photodetectors, corresponding to pixels, which receive laser returns 54 and provide electrical signals in response thereto. The electrical signals are compared to predetermined thresholds via the threshold-crossing comparators 20. If laser energy of a particular pixel surpasses a set threshold as indicated by the electrical signals output from the TIA's 22, then the threshold-crossing comparator 20 corresponding to that pixel outputs a high state until the laser energy passes back below the threshold. The corresponding threshold-crossing comparator then outputs a low state. Consequently, the threshold-crossing comparators 20 output a digital signal corresponding to laser returns received for the pixels in the FPA 16.

The timing circuitry 24 measures rising and falling pulses in the digital signal output from the threshold-crossing comparators 20. The resulting times are stored in the range and pulse width memory 26. In the present embodiment, the time at which a rising edge is detected is stored as pulse range information, also called pulse time of arrival. The time at which the corresponding falling edge is detected is subtracted from the pulse range and then stored as pulse width information in the range and pulse width memory 26. Subtractor circuits (not shown) may be employed to compute pulse width, or the subtraction functionality may be built into the timing circuitry 24. Alternatively, instead of storing pulse width information directly, falling edge timing information may be stored directly as the time at which the falling edge was detected.

The return pulse characterization module 34 selectively accesses timing information stored in the range and pulse width memory 26. The return pulse characterization module 34 cleverly computes pulse-intensity and pulse-centroid information based on the pulse width information. The return pulse characterization module 34 maintains information pertaining to a shape of the fired energy pulse and expected shapes of corresponding return pulses. The expected shapes are employed by the return pulse characterization module 34 to selectively determine pulse intensity and pulse centroid based on the pulse width.

In the present embodiment, the return pulses 54 have Gaussian profiles. Pulse intensity varies predictable with the pulse width, as discussed more fully below. Consequently, the intensities of the pulses 54 can be determined from the widths of pulses in the digital signal output by the threshold-crossing comparators 20, which corresponds to the difference between rise and fall times of pulses in the digital signal. Similarly, in systems lacking severe pulse skewing, the centroid of a given pulse is approximately midway between the rising edge and falling edge of the corresponding digital pulse. Accordingly, those skilled in the art with access to the present teachings may readily implement algorithms required to infer pulse intensity and centroid without departing from the scope of the present teachings.

In some ladar system implementations, transistor saturation effects or other electronic effects may cause pulse skewing or distortion. To more accurately determine pulse intensity and centroid based on times at which pulse edges are detected, the return pulse characterization module 34 compensates for any pulse skewing or distortion. Those skilled in the art will know how to adjust algorithms running on the return pulse characterization module 34 to compensate for any pulse skewing and/or distortion without undue experimentation.

Pulse-intensity, centroid, and range information for the pixels in the FPA 16 are provided to the imaging system 36 via the return pulse characterization module 34. The imaging system 36 collects data contained in returns for each pixel and then constructs a corresponding image of the scene 12. By obviating the need to directly sample return pulses with slow, bulky, inefficient, sample-and-hold circuits, sufficient data throughput is readily achieved to enable the imaging system 36 to process multiple returns per pixel and to create a corresponding enhanced three-dimensional image or sequence of images in response thereto. Use of multiple returns (return signals) enables enhanced image depth resolution of three inches or less.

Unlike previous approaches, the pulse centroid is determined by comparing rise and fall times. Conventional ladar systems require analog comparator circuitry to determine pulse centroids. Furthermore, such systems typically lack onboard range/pulse-width registers.

The readout circuit 18 reduces or eliminates clipping problems occurring with high-speed low-dynamic range processes by obviating the need to sample received pulses. The intensities of clipped pulses can be inferred by reference to the pulse width. Conventional systems typically cannot resolve adjacent returns without maintaining intensity information. Such intensity information is lost by conventional systems as pulse width decreases; system bandwidth requirements increase; the noise floor increases; and dynamic range decreases.

The readout circuit 18 can also accommodate very narrow pulses, which would otherwise require prohibitively fast sample-and-hold circuitry. Use of very narrow pulses is particularly advantageous for stealthy operations and for freezing high-speed motion and reducing or eliminating any image blurring due to scene motion relative to the system 10.

The imaging system 36 provides enhanced imaging information to the target recognition and tracking module 38. The target recognition and tracking module 38 may analyze the image information via match filtering, velocity filtering, and/or other techniques to locate and track targets in the scene 12. Information about the target, such as target location, velocity, and type, which is extracted by the target recognition and tracking module 38 from the image information, is provided to the guidance system 42. The guidance system 42 employs the target information to selectively control the steering actuators 46. When the system 10 is employed on a missile (not shown), the steering actuators 46 are adjusted so that the missile is steered toward the target.

The threshold-adjustment module 28 individually adjusts threshold levels corresponding to each detector in the FPA 16 via input to the threshold-crossing comparators 20. In the present specific embodiment, the threshold-adjustment module 28 incorporates a global threshold that is applied to all detectors in the FPA 16 and an individual pixel offset that is customized for each detector to achieve a desired false alarm rate distribution across the FPA 16. The threshold-adjustment module 28 may dynamically adjust pixel thresholds in response to feedback received from the imaging system 36 via the controller 40 to optimize image quality. Algorithms required to perform such adjustments may readily be implemented by those skilled in the art and with access to the present teachings. Alternatively, individual pixel thresholds are maintained during system operation and are initialized by aiming the system 10 at a uniform scene (not shown) and making appropriate threshold adjustments to normalize detector responses.

The use of time-programmable global and individual thresholds is advantageous, enabling further image quality optimization. Conventional readout circuit architectures employ a single global threshold to compensate for false alarms, and the global threshold is applied simultaneously to all pixels in the Focal Plane Array (FPA).

The counter-activation module 32 determines when the laser 44 is to be fired via input received from the laser controller 44. The counter-activation module 32 then activates the timing circuitry 24 accordingly. In the present specific embodiment, high-speed counters included in the timing circuitry 24 are sequentially activated in accordance with a predetermined optimum sequencing scheme to efficiently manage system power resources without significantly compromising system imaging capabilities.

Those skilled in the art with access to the present teachings may readily construct various modules and components of the ladar system 10, including algorithms running on the computer 30, such as the imaging algorithm running on the imaging system 36 capable of handling multiple returns, without undue experimentation.

The readout circuit 18 may be implemented via an Application-Specific Integrated Circuit (ASIC) and a microchip (not shown). In the embodiment of FIG. 1, no analog signals other than power are delivered to the integrated circuit chip (not shown) on which the readout circuit 18 is implemented.

Storing the data in digital form in the range/pulse-width memory 26 facilitates efficient and fast data transfer to and from the readout circuit 18, allowing high-speed frame rates of multiple kHz or more. This is very fast compared to previous readout circuit architectures, which had frame rates limited to 30–60 Hz.

When building the system 10, a phenomenon called ground bounce should be accounted for. Ground bounce typically results from large currents switching on and off in nanosecond times. Large circuit voltage changes during each current transition may result from mutual inductance between conductors.

To mitigate ground bounce, the ASIC chip (not shown) upon which the system 10 is implemented, and particularly the ASIC chip upon which the readout circuit 18 is implemented, is divided into 4 quadrants (not shown). This allows sequential clock turn on for each quadrant, which minimizes the initial current surge to the read out integrated circuit 18.

Geometry is also important. To minimize noise pickup, no clocks are run near the TIA's 22. Parts of the chip (not shown) associated with the readout integrated circuit 18 are turned on and off to minimize thermal loading. Furthermore, the chip carrier (not shown) employs low inductance capacitors to minimize ground bounce.

Figure 2:
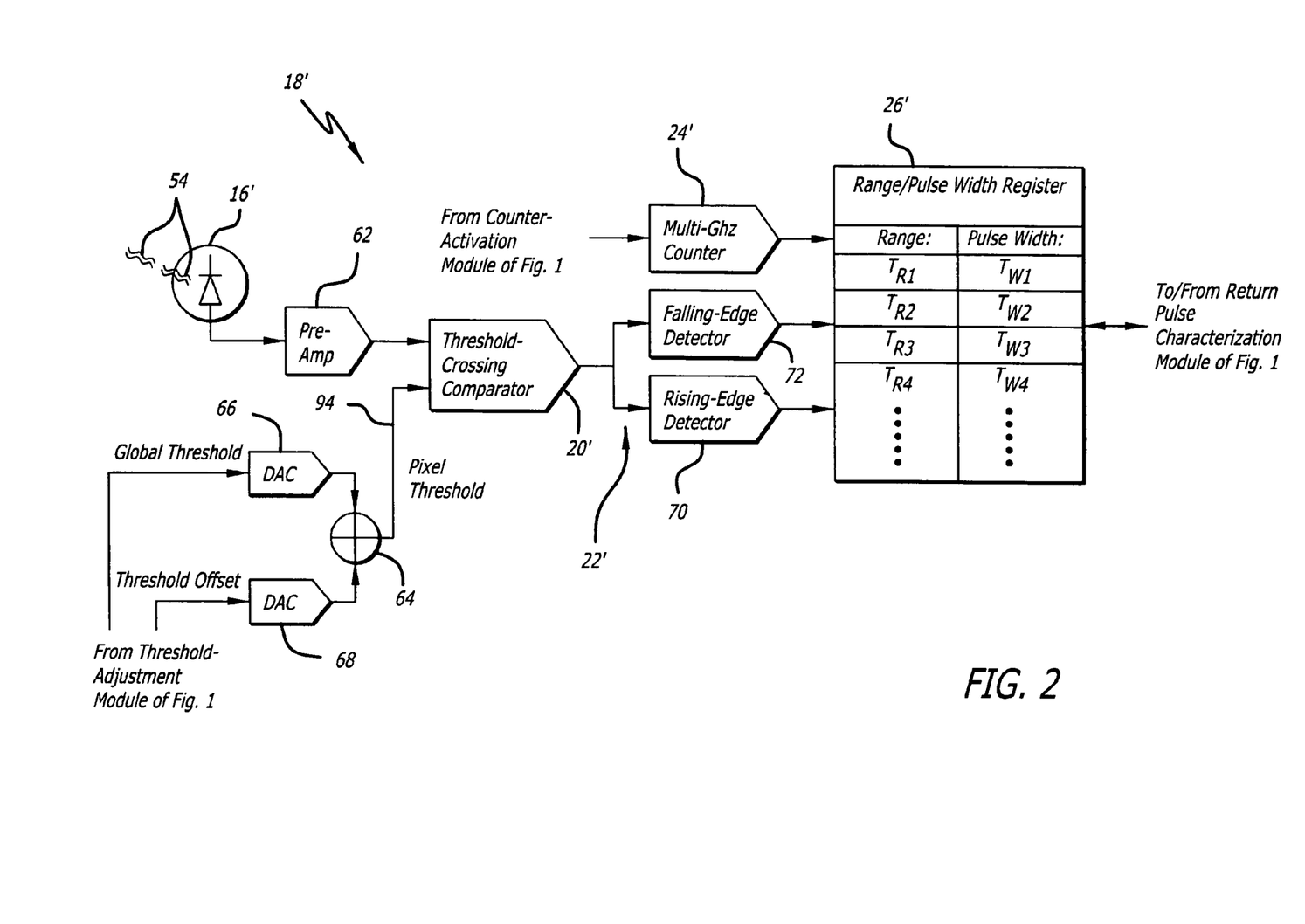
FIG. 2 is a more detailed diagram of an exemplary component of the readout circuit of FIG. 1.

FIG. 2 is a more detailed diagram of an exemplary element 18' of the readout circuit 18 of FIG. 1. The readout circuit element 18' accommodates output from a single photodetector 16'. The photodetector 16' provides input to a transimpedance pre-amplifier 62, which provides input to a threshold-crossing comparator 20'. The threshold-crossing comparator 20' also receives input from an adder 64, which receives input from a first Digital-to-Analog Converter (DAC) 66 and a second DAC 68. The first DAC 66 receives a digital global threshold input from the threshold-adjustment module 28 of FIG. 1, and the second DAC 68 receives a digital threshold-offset signal from the threshold-adjustment module 28 of FIG. 1. The DAC's 66, 68 may be omitted, and the threshold-adjustment module 28 of FIG. 1 may output digital threshold signals, without departing from the scope of the present invention.

A range gate 54 is input to the threshold-crossing comparator 20', which can turn off the comparator 20' until a desired range is achieved. The system 10 of FIG. 1 can then blank out undesired returns until the target of interest is reached.

A 4 GHz phase-locked-loop (PLL) 50 receives input from a reference clock 56. This enables a low speed digital interface, such as a 20 MHz. Interface (not shown) between the computer 30 and the ASIC chip corresponding to the readout circuit 18 of FIG. 1 with various elements 18' of FIG. 2. This facilitates interface design and reduces chip costs. A 4 GHz interface is generally more difficult to build than a 20 MHz interface.

The threshold-crossing comparator 20' provides input to edge detectors 52, which include a rising-edge detector 70 and a falling-edge detector 72. Outputs of the edge-detectors 70, 72 are selectively clocked into a range/pulse width register 26' via a high-speed multi-gigahertz counter 24', which receives an enable signal from the counter-activation module 32 of FIG. 1.

The range/pulse-width register 26' stores range data ($T_{R1} \ldots T_{Rn}$) and pulse width data ($T_{W1} \ldots T_{Wn}$) for several laser returns. The laser returns may include returns originating from a single laser pulse fired toward the scene (see 12 of FIG. 1) and/or returns from plural fired pulses. The stored range and pulse width data is accessible to the return pulse characterization module 34 of FIG. 1. The range/pulse-width register 26' can also be selectively cleared via a clearing signal from the return pulse characterization module 34 in response to input from the controller 40 of FIG. 1.

The exact architecture of and size of the range/pulse-width register 26' is application specific, and those skilled in the art will know how to implement the register 26' to meet the needs of a given application without undue experimentation.

In operation, the photodetector 16' receives laser energy 54 reflected from a scene, such as the scene 12 of FIG. 1, and provides an electrical current signal in response thereto. In the present embodiment, the photodetector 16' is implemented via a GaAs photodiode. The resulting current signal is converted to a voltage signal via the transimpedance pre-amplifier 62 and then input to the threshold-crossing comparator 20'. The threshold-crossing comparator 20' compares the voltage input to a customized threshold input from the adder 64. The output of the adder 64 represents a threshold value that is customized for the photodetector 16'.

The threshold-crossing comparator 20' outputs a high voltage state when the voltage signal output from the pre-amplifier 62 surpasses the threshold. When the voltage signal passes below the threshold, the threshold-crossing comparator 20' outputs a low voltage state. Consequently, the output of the threshold-crossing comparator 20' is a digital signal based on the output of the photodetector 16' that is constructed without sampling.

Those skilled in the art will appreciate that another type of threshold, other than a custom threshold, may be employed without departing from the scope of the present invention. Furthermore, more than one threshold may be provided to the threshold-crossing comparator 20' for comparison to the voltage input from the pre-amplifier 62. For example, separate thresholds may be employed to determine the rising edge and the falling edge of a particular voltage pulse.

The rising edges and falling edges of the pulses in the digital signal output from the threshold-crossing comparator 20' are detected by the rising edge detector 70 and the falling-edge detector 72, respectively. The high-speed counter 24' times when a rising edge is detected and when a falling edge is detected for a particular pulse, and the resulting times are stored in the range/pulse-width register as range information and pulse width information.

In the present embodiment, the high-speed counter 24' is a 5 GHz counter. In addition, the various components of the ladar readout circuit element 18' are implemented via the latest lithography processes, such as such as the IBM SiGe 7HP process. Such processes may facilitate circuit clock rates above 10 GHz. To the inventors' knowledge, SiGe has not been previously used in readout circuits.

In the best mode, the circuitry beyond the threshold-crossing comparator 20' is digital and resistant to analog noise. Furthermore, improved data integrity and retention is attained.

With reference to FIGS. 1 and 2, the system 10 exhibits various beneficial features, including:

1. The system 10 may accommodate a large FPA 16, such as 32×32 or greater.
2. Detector biasing via the detector biasing circuit 48 promotes efficient operation of the readout circuit 18.
3. High bandwidth capabilities of the system 10 allow for high resolution, which allows separation of two objects close together.
4. A 4 GHz or faster phase-locked-loop 50 in the timing circuitry 24 promotes high accuracy and facilitates interfacing the high-speed ROIC 18 with the computer 30.
5. A global pixel threshold can be adjusted at a very high speed (>20 MHz) via the threshold-adjustment module 28 and associated digital interface (not shown) between the threshold-adjustment module 28 and the threshold crossing comparators 20. The threshold-adjustment module 28 enables time-programmable adjustments that can accommodate individual detector sensitivities.
6. The system 10 can record multiple returns 54 from a single fired pulse 52 and can guarantee last return captured (if one present) necessary to see targets under trees.
7. The system 10 employs 4 quadrants (not shown) and sequencing to accommodate ground bounce.
8. The system 10 employs range gating via the range gate circuit 54.

Figure 3:
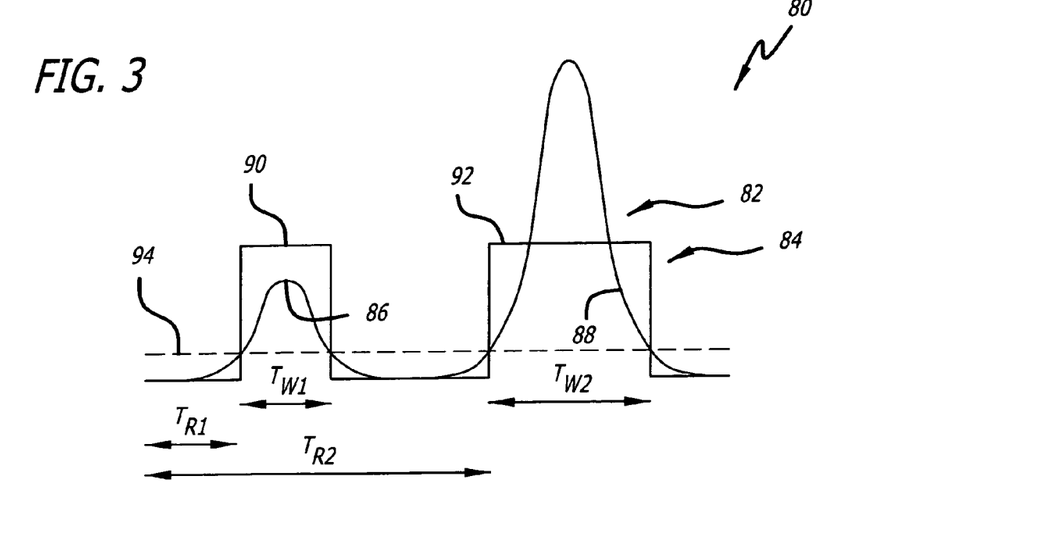
FIG. 3 is a graph illustrating exemplary inputs to and corresponding outputs of the threshold-crossing comparator of the readout circuit of FIG. 2.

FIG. 3 is a graph 80 illustrating exemplary inputs 82 to and corresponding outputs 84 of the threshold-crossing comparator 20 of the readout circuit element 18' of FIG. 2. The graph 80 includes an analog input waveform 82 comprising a first analog pulse 86 and a second analog pulse 88. A digital output waveform 84 includes a first digital pulse 86 and a second digital pulse 92.

With reference to FIGS. 2 and 3, the threshold-crossing comparator 20' senses when the initial analog input pulse 86 surpasses the threshold 94 and outputs a high state corresponding to the first digital pulse 90. When the voltage level of the initial input pulse 86 passes below the threshold 94, the threshold-crossing comparator 20' outputs a low voltage state. The threshold-crossing comparator 20' operates similarly for the second analog pulse 88, yielding the corresponding second digital pulse 92.

The times ($T_{R1}$, $T_{R2}$) at which the rising edges of the digital pulses 90, 92 are detected by the edge detectors 52 represent range information. Times at which the falling edges of the digital pulses 90, 92 are detected by the edge detectors 52 are employed to compute pulse widths. Pulse width information and range information is sufficient to compute the intensity and centroid of the analog pulses 86, 88, since the pulses 86, 88 are Gaussian and vary predictable with pulse width. The pulse centroids are often approximately midway between rising and falling pulse edges. However, pulse skewing may predictably shift the location of the centroids relative to the rising and falling edges of the digital pulses 90, 92. Systems and algorithms for accommodating pulse skewing are application specific and may be readily determined by those skilled in the art to meet the needs of a given application.

In conventional systems, very intense analog pulses, such as the analog pulse 88 may be clipped due to low system dynamic range. Consequently, intensity and pulse-centroid information is often lost, which compromises imaging system capabilities. However, ladar systems constructed in accordance with the present invention may cleverly compute intensity information for very intense pulses by measuring times at which rising edges and falling pulse edges are detected.

Figure 4:
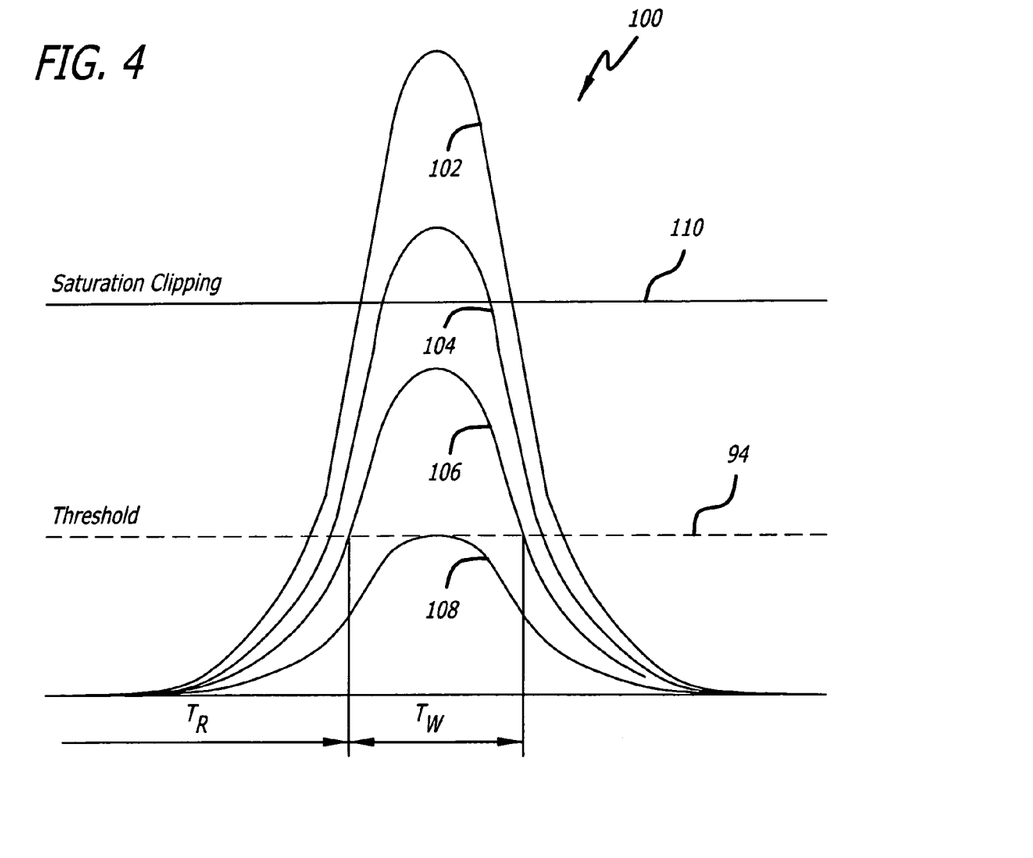
FIG. 4 is a diagram illustrating how laser return pulse width varies with intensity.

FIG. 4 is a diagram 100 illustrating how laser return pulse width varies with intensity. In the present specific embodiment, laser pulses that result in Gaussian returns are employed. The diagram 100 illustrates four exemplary Gaussian returns 102, 104, 106, and 108 in order of decreasing intensity. As pulse intensity increases, pulse width increases accordingly. The pulses 102 and 104 are sufficiently intense to surpass an exemplary saturation clipping level 110. However, the intensities and the centroids of these pulses may be extrapolated from pulse width information.

The pulse 108 is too small to surpass the threshold 94, and consequently, goes undetected by the threshold-crossing comparator 20'. The threshold 94 is adjusted relative to noise levels and photodetector sensitivity to yield a desired number of false alarms and to achieve a desired overall image quality. The adjustments are performed via the threshold-adjustment module 28 running on the computer 30 of the system 10 of FIG. 1.

The Gaussian pulses 102–108 may be approximated by the following equation, which does not account for pulse skewing:

$$I \approx \frac{e^{-(t-m)^2/2\sigma^2}}{\sqrt{2\pi} \cdot \sigma}, \quad [1]$$

where σ and m are constants, called the standard deviation and expected value, respectively; I represents pulse intensity, and t represents time:

Those skilled in the art will appreciate that pulses other than Gaussian may be employed without departing from the scope of the present invention. In these cases, algorithms for computing pulse intensity and pulse centroid based on times at which pulses pass certain thresholds are adjusted accordingly.

Thus, the present invention has been described herein with reference to a particular embodiment for a particular application. Those having ordinary skill in the art and access to the present teachings will recognize additional modifications, applications, and embodiments within the scope thereof.

It is therefore intended by the appended claims to cover any and all such applications, modifications and embodiments within the scope of the present invention.

Accordingly,

What is claimed is:

1. A system for receiving a signal from a scene comprising:
    first means for detecting said signal and providing a detected signal in response thereto, said first means including an array of said detectors and said detected signal having a pulse therein;
    second means for computing pulse time of arrival and/or pulse intensity based on a first time at which a rising edge of said pulse crosses a first threshold and a second time at which a falling edge of said pulse crosses a second threshold, said first threshold and said second threshold being the same threshold value; and
    third means for generating an image based on said second signal;
    said second means including:
        fourth means for timing when said rising edge of said pulse passes said first threshold and when said falling edge of said pulse passes a second threshold and providing said first and second times in response thereto and
        fifth means for computing pulse centroid based on said first and second times,
        said fourth means including:
            a threshold-crossing comparator that receives said threshold value and said detected signal as input and provides a digital signal as output in response thereto and
            sixth means for generating thresholds adapted to each detector in said array of detectors, said sixth means employing a global threshold associated with all detectors in said array of detectors and providing an individual threshold adjustment to said global threshold so that each detector is associated with a threshold adapted to that detector.

2. The system of claim 1 wherein said first means includes a detector for receiving electromagnetic energy and providing an electrical signal in response thereto.

3. The system of claim 1 wherein said fourth means further includes a rising edge detector and a falling edge detector that receive said digital signal as input and provide rising edge and falling edge information in response thereto.

4. The system of claim 3 wherein said fourth means further includes a storage mechanism in communication with a high-speed counter for timing receipt of said rising edge information and said falling edge information and maintaining said first and second times in response thereto.

5. The system of claim 4 wherein said storage mechanism includes a register that maintains each of said first and second times as a time at which a first edge was detected and a time difference between when said first edge and a subsequent edge were detected.

6. A system for receiving a signal from a scene comprising:
    first means for detecting said signal and providing a detected signal in response thereto, said first means including an array of detectors, each of said detectors being a photodetector, said signal received from said scene including one or more return signals from a laser pulse, said detected signal being an electrical signal, and said detected signal having a pulse therein;
    second means for computing pulse time of arrival and/or pulse intensity based on a first time at which a rising edge of said pulse crosses a first threshold and a second time at which a falling edge of said pulse crosses a second threshold, said first threshold and said second threshold being the same threshold value; and
    third means for generating an image based on said second signal;
    wherein said second means further includes fourth means for timing when said rising edge of said pulse passes said first threshold and when said falling edge of said pulse passes said second threshold and providing said first and second times in response thereto and fifth means for computing pulse centroid based on said first and second times; and
    said fourth means further includes a threshold-crossing comparator that receives one of said threshold values and said detected signal as an input and provides a digital signal as output in response thereto.

7. The system of claim 6 wherein said system includes a ladar readout circuit and a range gate.

8. A ladar system comprising:
    first means for firing a laser pulse toward a scene;
    second means for measuring return pulses by registering rising edges and falling edges of return pulses and providing a digital signal in response thereto, said second means including:
        an array of said photo detectors and corresponding threshold-crossing comparators to determine when said electrical signals pass predetermined thresholds to register said rising edges and said falling edges, each photo detector associated with a counter for timing registration of said rising edges and said falling edges and
        means for selectively controlling activation of said counters in response to activation of said first means to facilitate power control; and third means for generating an image of a scene illuminated by said laser pulse based on output of said second means.

9. The system of claim 8 further including fourth means for guiding a vehicle based on output from said second means.

10. The system of claim 8 further including fifth means for tracking a target based on output from said second means.

11. A system for receiving a signal from a scene comprising:
   first means including an array of detectors for detecting said signal and providing a detected signal in response thereto, said detected signal having a pulse therein;
   second means for computing pulse time of arrival and/or pulse intensity based on a first time at which a rising edge of said pulse crosses a first threshold and a second time at which a falling edge of said pulse crosses a second threshold, said first threshold and said second threshold being the same threshold value, said second means including:
      third means for timing when said rising edge of said pulse passes said first threshold and when said falling edge of said pulse passes said second threshold and providing said first and second times in response thereto, said third means including a threshold-crossing comparator that receives said threshold value and said detected signal as input and provides a digital signal as output in response thereto,
      fourth means for computing a pulse centroid based on said first and second times, said fourth means employing a global threshold associated with all detectors in said array of detectors and provides an individual threshold adjustment to said global threshold so that each detector is associated with a threshold adapted to a respective detector and
      fifth means for generating thresholds adapted to each detector in said array of detectors.

12. A ladar system comprising:
   first means for firing a laser pulse toward a scene;
   second means for measuring return pulses by registering rising edges and falling edges of return pulses and providing a digital signal in response thereto, said second means including:
      an array of photodetectors for receiving laser return signals and providing electrical signals in response thereto, each photo detector associated with a counter for timing registration of said rising edges and said falling edges,
      and threshold-crossing comparators to determine when said electrical signals pass predetermined thresholds to register said rising edges and said falling edges,
      third means for generating an image of a scene illuminated by said laser pulse based on output of said second means; and
      fourth means for selectively controlling activation of said counters in response to activation of said first means to facilitate power control.

13. The system of claim 12 further including fifth means for guiding a vehicle based on output from said second means.

14. The system of claim 12 further including fifth means for tracking a target based on output from said second means.

* * * * *